United States Patent [19]

Hlawatschek et al.

[11] Patent Number: 4,829,538
[45] Date of Patent: May 9, 1989

[54] FURNACE HEARTH

[75] Inventors: Hartmut Hlawatschek, Mainz-Bretzenheim; Günter Gelsdorf, Weisbaden-Nordenstadt; Kurt Böhm, Bottrop; Manfred Schubert, Oberhausen, all of Fed. Rep. of Germany

[73] Assignees: Didier-Werke AG, Wiesbaden; M.A.N. Maschinenfabrik Augsburg-Nurnberg Aktiengesellschaft, Oberhausen, both of Fed. Rep. of Germany

[21] Appl. No.: 711,630

[22] Filed: Mar. 14, 1985

[30] Foreign Application Priority Data

Mar. 14, 1984 [DE] Fed. Rep. of Germany ....... 3409255

[51] Int. Cl.$^4$ ................................................ F27D 1/00
[52] U.S. Cl. ..................................................... 373/72
[58] Field of Search ...................... 373/72, 108, 44, 45

[56] References Cited

U.S. PATENT DOCUMENTS 941,419 11/1909 Keller .................................... 373/72
4,228,314 10/1980 Stenkvist .............................. 373/72

FOREIGN PATENT DOCUMENTS 12258 of 1909 United Kingdom ................... 373/72

Primary Examiner—Roy N. Envall, Jr.
Attorney, Agent, or Firm—Wenderoth, Lind & Ponack

[57] ABSTRACT

A hearth for use in a furnace, which comprises an upper layer of magnesia containing chromic oxide, a lower layer containing graphite and an organic bonding agent, and an intermediate layer of a mixture of the materials forming the upper and lower layers. The hearth is particularly useful in DC arc funaces, in which steel rods embedded in the bottom act as the anode. The hearth has improved service durability.

11 Claims, 1 Drawing Sheet

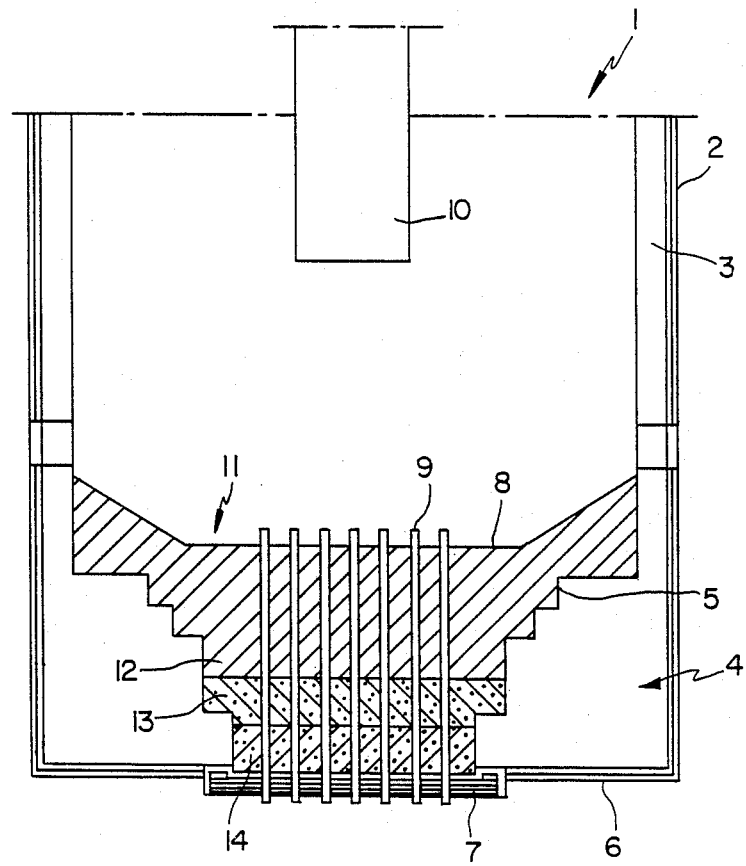

FURNACE HEARTH

BACKGROUND OF THE INVENTION

The present invention relates to a furnace hearth, more particularly for DC arc furnaces of the type having a concentric graphite electrode which extends into the metal furnace shell and a plurality of coaxially standing metal or steel rods embedded in the bottom of the furnace and the outer ends of which are held by a steel foundation plate for the metal furnace shell.

In this type of furnace, which was recently put into operation, the metal shell or jacket of the hearth has a concentric steel plate with embedded steel rods which penetrate refractory material in the bottom of the furnace until they reach the fire side. The steel rods act as the anode, while a conventional graphite electrode arranged concentrically at the top of the furnace is connected as the cathode. In a manner of speaking, the arc runs into the hearth bottom, subjecting it to extremely high stresses that older bottoms in use, e.g. of conventional three-phase arc furnaces, cannot withstand satisfactorily.

SUMMARY OF THE INVENTION

The present invention has as its object the provision of a hearth for a furnace, preferably for DC arc furnaces, with a holding time that is satisfactory in practical use.

According to the invention, this object is achieved by providing a hearth with, at least in the area of the steel rods or the steel plate, an upper fire-side layer of chromic-oxide-containing magnesia, a lower organically bound graphite layer, and an intermediate layer of a mixture of both materials.

BRIEF DESCRIPTION OF THE DRAWING

The single drawing shows a cross-sectional view of a DC arc furnace having a hearth according to the present invention.

DETAILED DESCRIPTION OF THE INVENTION

Thus, the present invention provides a hearth for use in a furnace, which comprises an upper fire-side layer of magnesia mass which contains MgO and $Cr_2O_3$, a lower layer of graphite mass which contains graphite and an organic bonding agent, and an intermediate layer, between the upper and lower layers, of a mixture of the magnesia mass and the graphite mass.

More particularly, the present invention provides a hearth for use in a DC arc furnace, which hearth comprises a metal shell having a refractory lining, and packed within the lined metal shell, an upper fire-side layer of magnesia mass which contains MgO and $Cr_2O_3$, a lower layer of graphite mass which contains graphite and an organic bonding agent, and an intermediate layer, between the upper and lower layers, of a mixture of the magnesia mass and the graphite mass.

This type of hearth is distinguished by excellent heat conduction and electrical conductivity parallel to the layers. The magnesia layer performs extremely well concerning the normal refractory functions of combating erosive attacks and thermal stresses of molten steel. The graphite-containing intermediate layer, which is still subjected to relatively high thermal stresses, causes heat compensation and in particular a uniform distribution of electrical current flow to the steel rods inserted in the bottom. A uniform electrical load on the steel rods is, in the final analysis, solely caused by the lower graphite layer which is in direct contact with the steel foundation plate forming the anode base. The thermomechanical behavior of the layer arrangement of the hearth as a unit is outstanding and provides a long service durability.

Preferably, the upper layer contains at least 90% by weight of MgO and at least 1.5% by weight of $Cr_2O_3$, and the lower layer contains at least 95% by weight of graphite.

The magnesia mass forming the upper layer, and the graphite mass forming the lower layer, may contain up to 8.5% by weight, and up to 5% by weight, respectively, of other refractory materials, for example, clay, $Al_2O_3$, $SiO_2$, aluminum hydroxide and titanium dioxide.

The $Cr_2O_3$ in the upper layer is preferably green fine-grained (e.g. up to 0.10 mm) $Cr_2O_3$.

The organic bonding agent used in the lower layer of graphite mass may be any organic bonding agent, for example, methyl cellulose, sulfite waste liquor or molasses. Preferably, 1–5% by weight of organic bonding agent is employed, based on the weight of the lower layer.

The intermediate layer is a mixture of the magnesia mass and graphite mass. Preferably, the intermediate layer contains 20–80%, more preferably 30–50%, most preferably 40%, by weight of the graphite mass.

Owing to its physical properties, the magnesia mass can withstand the fire-side operating conditions of the furnace extremely well. Outstanding behavior is also found in the graphite mass with respect to conductivity, and in the mixture of masses, which can be readily mixed and which, during ramming of the masses, interlinks both with the magnesia mass and with the graphite mass without forming distinct layers.

With respect to the structural formation of the hearth the fire-side, upper magnesia layer should preferably amount to a least one-half the total thickness of the upper lower and intermediate layers. That is, the upper layer is preferably at least as thick as the total thickness of the lower and intermediate layers combined This leads to expedient dimensions of the layers for the hearth.

For static reasons, the layers are advantageously arranged within a refractory lining for the hearth, which has been deposited step by step until it reaches the concentric steel foundation plate.

The present invention also provides an improvement in the conventional DC arc furnaces. That is, the present invention provides, in a DC arc furnace comprising an upper metal shell having a refractory lining, a graphite electrode extending through the upper shell for acting as a cathode, a steel foundation plate, a plurality of metal or steel rods secured to the plate in concentric relation to the graphite electrode for acting as an anode, and a hearth also secured to the plate, the improvement wherein the hearth comprises a lower metal shell having a refractory lining and being aligned with and fixed to the upper metal shell, and packed within the lined lower metal shell, an upper fire-side layer of magnesia mass which contains MgO and $Cr_2O_3$, a lower layer of graphite mass which contains graphite and an organic bonding agent, and an intermediate layer, between the upper and lower layers, of a mixture of the magnesia mass and the graphite mass The invention will now be described with reference to an example in conjunction with the accompanying drawing.

In the drawing, 1 denotes a DC arc furnace having a metal shell or jacket 2 and a refractory lining 3. In the hearth 4, the lining 3 is formed as a stepped circumferential slope 5 which extends to the outer periphery of a steel plate 7 arranged in the metal bottom 6 and in which, distributed over a circular area, there are embedded vertical steel rods 9 extending through the fire-side bottom surface 8. These steel rods form the anode of an electrode connection and face a graphite electrode 10, as cathode, extending through the furnace cover.

The hearth layers 11, in which the steel rods 9 have been embedded, consist of an upper magnesia mass layer 12 composed of MgO and $Cr_2O_3$, an intermediate layer 13 composed of magnesia mass and graphite mass, and a lower graphite mass layer 14. The layers 12, 13 and 14 are made of unshaped refractory materials, whereby, within the circumferential slope 5 of the hearth 4, first the graphite mass layer 14 is rammed with a compression that causes the lamellar graphite to align horizontally, thereby enhancing, above all, the electrical conductivity of the layer 14. Then, the intermediate layer 13 and the magnesia mass layer 12 are rammed into place. The three layers are properly interlinked at the interfaces, in view of the intermediate layer 13 which has both the characteristics of the magnesia mass layer 12 and the graphite mass layer 14. The result is an excellent bonding of the layers 12, 13, 14 without the formation of distinct layers, which is extremely beneficial to the general behavior of the hearth during operation.

It is apparent that during the operation of the furnace the arc acts directly on the charge which, for example, over pieces of metal that have not yet been melted down, may have differing contacts with the steel rods 9. A different flow of current through the anode section caused thereby is largely prevented by the electrically conducting layers 13 and 14 acting as an electrical bond between the steel rods 9. The magnesia layer 12, which is hardly a good electrical conductor, dissipates the heat in the direction of the metal jacket 2, so that harmful temperature effects are kept away from the underlying, less heat-resistant, layers 13 and 14.

We claim:

1. A hearth for use in a furnace, which comprises an upper fire-side layer of magnesia mass which contains MgO and $Cr_2O_3$ but does not contain graphite, a lower layer of graphite mass which contains graphite and an organic bonding agent but does not contain MgO or $Cr_2O_3$, and an intermediate layer, between said upper and lower layers, of a mixture of said magnesia mass and said graphite mass.

2. A hearth for use in a DC arc furnace, which hearth comprises a metal shell having a refractory lining, and packed within said lined metal shell, an upper fire-side layer of magnesia mass which contains MgO and $Cr_2O_3$ but does not contain graphite, a lower layer of graphite mass which contains graphite and an organic bonding agent but does not contain MgO or $Cr_2O_3$, and an intermediate layer, between said upper and lower layers, of a mixture of said magnesia mass and said graphite mass.

3. The hearth according to claim 2, wherein said upper layer contains at least 90% by weight of MgO and at least 1.5% by weight of $Cr_2O_3$, and said lower layer contains at least 95% by weight of graphite.

4. The hearth according to claim 2, wherein said intermediate layer contains 20–80% by weight of said graphite mass.

5. The hearth according to claim 2, wherein said upper layer is at least as thick as the total thickness of said lower and intermediate layers combined.

6. The hearth according to claim 2, wherein said refractory lining is in a stepped-up slope from the bottom of said hearth.

7. In a DC arc furnace comprising an upper metal shell having a refractory lining, a graphite electrode extending through said upper shell for acting as a cathode, a steel foundation plate, a plurality of metal or steel rods secured to said plate in concentric relation to said graphite electrode for acting as an anode, and a hearth also secured to said plate, the improvement wherein said hearth comprises a lower metal shell having a refractory lining and being aligned with and fixed to said upper metal shell, and packed within said lined lower metal shell, an upper fire-side layer of magnesia mass which contains MgO and $Cr_2O_3$ but does not contain graphite, a lower layer of graphite mass which contains graphite and an organic bonding agent but does not contain MgO or $Cr_2O_3$, and an intermediate layer, between said upper and lower layers, of a mixture of said magnesia and said graphite mass.

8. The furnace according to claim 7, wherein said upper layer contains at least 90% by weight of MgO and at least 1.5% by weight of $Cr_2O_3$, and said lower layer contains at least 95% by weight of graphite.

9. The furnace according to claim 7, wherein said intermediate layer contains 20–80% by weight of said graphite mass.

10. The furnace according to claim 7, wherein said upper layer is at least as thick as the total thickness of said lower and intermediate layers combined.

11. The furnace according to claim 7, wherein said refractory lining in said hearth is in a stepped-up slope from the bottom of said hearth.

* * * * *